3,100,167
Patented Aug. 6, 1963

3,100,167
MAGNETIC MATERIAL

Richard B. Falk and George D. Hooper, Greenville, Mich., assignors to General Electric Company, a corporation of New York No Drawing. Filed Oct. 19, 1960, Ser. No. 63,487
4 Claims. (Cl. 148—31.57)

This invention relates to magnetic material consisting essentially of non-elongated, single domain magnetic particles and to a process of preparing said magnetic material.

Copending application Serial No. 500,078, filed April 8, 1955, and now U.S. Patent 2,974,104, assigned to the same assignee as this invention, discloses magnetic materials comprising elongated magnetic particles of iron or iron and cobalt having transverse dimensions which are those of a single magnetic domain. The vastly improved magnetic properties of the elongated, single domain particles are principally attributed to the shape anisotropy of the magnetic materials. The elongated, single domain magnetic particles are prepared by electroplating iron or iron-cobalt alloys into a molten metal cathode, such as mercury, under quiescent interface conditions between the molten cathode and the electrolyte.

For certain purposes, magnetic materials are desirable which do not depend upon shape anisotropy for their magnetic properties. For example, in uses requiring an extremely high packing fraction of the permanent magnet structure, magnetic materials which depend upon shape anisotropy for their magnetic properties suffer great losses in total magnetic energy because at such high packing fractions the coercive force of such magnetic materials decreases drastically. Other applications do not necessitate particle alignment or orientation of the magnetic material as in the case of certain types of magnetic tapes. It is therefore desirable for these and other uses to have magnetic materials depending upon crystal, rather than shape anisotropy, for their magnetic properties.

It is an object of the present invention to provide a magnetic material whose properties are derived from crystal anisotropy but which nevertheless possess relatively high coercive force and total magnetic energy. It is an additional object of this invention to provide a relatively simple and inexpensive process for producing the aforesaid magnetic materials.

It has unexpectedly been found that if particles having a certain critical percentage of cobalt and nickel are electrodeposited in accordance with the process of the aforesaid copending application Serial No. 500,078, the particles are non-elongated, possess high coercive force and depend principally upon crystal anisotropy for their magnetic properties.

The magnetic materials of the present invention comprise non-elongated fine particles, each of the particles consisting essentially of an alloy containing from 5 to 25 percent nickel, the balance substantially all cobalt and impurities, the dimensions of each of said particles being that of a single magnetic domain. The most likely impurity in the particles will be iron because it is commonly found in association with cobalt and nickel metal and their salts. The intrinsic coercive force of particles of the present magnetic materials is generally above 1400 oersteds and ranges as high as 1750 oersteds if optimum ratios of nickel and cobalt, and electroplating procedures, are used. This coercive force compares favorably with the intrinsic coercive force of elongated, single domain iron or iron-cobalt particles prepared in accordance with the aforesaid copending application Serial No. 500,078.

The aforesaid copending application Serial No. 500,078 describes the fine particles of the permanent magnetic material as being distinctly elongated and having transverse dimensions of a single magnetic domain. Specifically, the particles there disclosed have a median elongation ratio of at least 1.5 to 1 and at least half the particles possess an elongation ratio of 2 to 1. The diameter of the particles ranges from about 100 to 1000 angstroms. In contrast thereto, the majority of the present particles of magnetic material are essentially spheroidal ranging in diameter from about 50 to 500 angstrom units and having a median diameter of approximately 250 angstrom units. The term "spheroidal" is used herein to describe particles having no single dimension substantially greater than any other dimension. It will be understood, however, that the particles may range from irregular in contour to spherical.

In general, the magnetic materials of this invention are prepared in substantially the same manner as the elongated particles of the aforesaid copending application Serial No. 500,078. Briefly stated, the process comprises electrolytically depositing fine particles into a liquid metal cathode from an acidic electrolyte comprising divalent ions of cobalt and nickel while maintaining a quiescent interface between said cathode and said electrolyte whereby to produce magnetic material consisting essentially of non-elongated fine particles, each of the particles consisting of an alloy containing from 5 to 25 percent nickel, the balance substantially all cobalt and impurities, each of said particles having dimensions of a single magnetic domain.

The electrolyte or plating solution may consist of the soluble bivalent salts of nickel and cobalt, suitable examples of which are nickel and cobalt sulfate or chloride. The pH of the electrolyte should be made acidic with, for example, sulfuric or hydrochloric acid and a preferred pH is approximately 2. The consumable anode may be pure nickel, pure cobalt or it may consist of an alloy of cobalt and nickel. A non-consumable anode of an inert material, such as platinum or graphite, may also be used. The cathode is a liquid metal, preferably mercury.

The current density may be varied over a wide range but will ordinarily be from 25 to 100 amps/sq. ft. with 75 amps/sq. ft. preferred. It has been found that the coercive force of the particles increases as the current density is raised from 25 to 75 amps/sq. ft., reaches a peak at 75 amps/sq. ft. and thereafter decreases. The maximum coercive force is obtained if the electrolyte has a cobalt$^{++}$/nickel$^{++}$ ion ratio of 10 to 1, although other ratios approaching this ratio may be used with some decrease in coercive force. The current density and electrolyte temperature both affect the final composition of the plated alloy particles. Higher current density favors the deposition of the less noble metal, cobalt. Higher temperature favors the deposition of the more noble metal, nickel. Ordinarily, room temperatures of 20° to 30° C. are preferred, although other electrolyte temperatures may be used to obtain the proper final composition, if suitable adjustments are made in current density and electrolyte composition.

It has been found that the optimum composition of cobalt and nickel—5 to 15 percent nickel, balance cobalt—are plated at a current density of about 75 amps/sq. ft. for one hour with an electrolyte ratio of cobalt++/nickel++ ions of 10. The variation in cobalt content of the plated particles, as it varies with the cobalt++/nickel++ ion concentration of the electrolyte, may be seen from the following table comparing electrolyte concentration with plated particle composition. The table affords comparative results at current density of both 25 amps/sq. ft. and 50 amps/sq. ft., the plating time in all cases being 60 minutes at 25° C. The variation in composition of particles plated at 75 amps/sq. ft. will be comparable with similar changes in $Co^{++}/Ni^{++}$ ion ratios.

TABLE I

| Ratio of $Co^{++}/Ni^{++}$ in electrolyte | Percent cobalt in electrolyte ($Co^{++}/Co^{++}+Ni^{++}$) | Percent cobalt in plated particles | |
|---|---|---|---|
| | | At 25 amp/sq. ft. | At 50 amp/sq. ft. |
| 1/1 | 50 | 12.7 | 47.1 |
| 5/1 | 83.3 | 62.7 | 74.9 |
| 10/1 | 90.9 | 82.6 | 87.8 |
| 100/1 | 99.0 | 98.1 | 99.1 |

After electroplating is completed, the cobalt-nickel particles-mercury slurry is concentrated so that the resulting slurry contains on the order of 3 percent by volume of cobalt-nickel in a mercury matrix. The particles are then heat treated to produce optimum coercive force by heating the particle-mercury mixture for from 5 to 20 minutes at temperatures up to 300° C. and preferably at about 150–200° C. and cooled. Lead as a matrix may then be added either in elemental form as chunks or pellets of lead or in admixture with mercury in accordance with the teachings of copending application Serial No. 702,803, filed December 16, 1957, and now U.S. Patent 2,999,778, assigned to the same assignee as the present invention. If desired, the fine particles may be coated with, for example, tin or an antimonide, the latter in accordance with the disclosure of copending application Serial No. 702,801, filed December 16, 1957, and now U.S. Patent 2,999,777, assigned to the same assignee as the present invention. The amounts of antimony to be added to the magnetic particle-mercury slurry and other processing details of coating with the antimonide are more fully set forth in the aforesaid copending application Serial No. 702,801.

After addition of the antimony coating and lead matrix, the remaining mercury may be removed as, for example, by vacuum distillation at an elevated temperature. It is not necessary, as in the case of anisotropic magnetic materials, to orient and press preforms of the particle-mercury slurry prior to mercury removal. The mecury-free mixture of particles and matrix is then gound into a powder and may be either hot or cold pressed into their final magnet structure.

The following example illustrates the preparation of non-elongated, single domain magnetic particles in accordance with the practice of the present invention.

*Example 1*

Cobalt-nickel particles were electrodeposited into a mercury cathode using an electrolyte of cobalt sulfate and nickel sulfate in which the cobalt++/nickel++ ion ratio was 10 to 1. The anode was of pure cobalt and was spaced 0.75 inch from the mercury cathode. The electrolyte had a pH of 2 and a molarity of 1.6. Using a current density of 75 amps/sq. ft., plating was continued for a period of one hour while maintaining a quiescent interface between cathode and electrolyte. The plated particles had a composition of 87 percent cobalt, 13 percent nickel. The resulting particle-mercury slurry was concentrated magnetically to a resulting concentration of about 3 percent cobalt-nickel particles. The concentrated slurry was heat treated for seven minutes at 175° C. Tin was then added as an amalgam (0.4 gm. tin, 100 gms. mercury). The amalgam was mixed with the slurry at room temperatures. The coercive force of the magnetic particles was then measured at —196° C., this temperature being necessary to freeze the mercury and lock the particles in place. The coercive force was 1750 oersteds and the particles had a $B_r/B_s$ ratio of 0.583.

A typical compact or finished magnet was prepared by pressing a slurry of the foregoing magnetic particles, tin and mercury, in a die at 80,000 p.s.i. The magnet had a total magnetic energy of $1.4 \times 10^6$ as measured at room temperature. The magnet structure contained approximately 45 percent by volume mercury.

If it is desired to add an antimonide coating or a lead matrix, it may be added after the above heat treating step in place of the tin amalgam addition. Subsequent to the addition of the antimony coating or lead matrix, mercury is removed by vacuum distillation at a temperature of about 300° C. to 400° C. and a pressure of less than 1 mm. of mercury for from 1 to 12 hours, depending upon the quantity of material distilled. The essentially mercury-free material is ground into a powder and either hot or cold pressed into a magnet structure.

It has been found that the coercive force may be increased even further, by as much as 400 oersteds or more, by allowing the uncoated alloy particles to oxidize in either a moist atmosphere or in another oxidizing medium, after electrodeposition is completed.

It has been found by determining the coercive force at magnetic packing fractions of from 0.03 to 0.42 that the intrinsic coercive force is substantially constant with change in packing fraction. (The magnetic packing fraction is that volume of the magnetic structure containing the magnetic material.) In view of the fact that the coercive force is constant with packing fraction, the maximum magnetic energy therefore increases in direct proportion to the packing fraction. On the basis of the essentially spheroidal structure of the particles observed in electron micrographs and on the basis of the constancy of the coercive force with packing fraction, it is concluded that crystal anisotropy is the principal factor contributing to the coercivity of the cobalt-nickel particles prepared in accordance with the present invention.

It will be understood that other coatings and other matrices may be used to produce magnet structures from the fine particle magnetic materials of this invention. In addition, variations in the specific electrodeposition procedure disclosed will occur to those skilled in the art and it is not intended to be limited except as set out in the claims which follow.

What we claim as new and desire to secure by Letters Patent of the United States is:

1. Magnetic material comprising non-elongated fine particles, each of said particles consisting essentially of an alloy of from 5 to 25 percent nickel, the balance substantially all cobalt and impurities, the dimensions of each of said particles being that of a single magnetic domain.

2. Magnetic material comprising non-elongated fine particles, each of said particles consisting essentially of an alloy of from 10 to 15 percent nickel, the balance substantially all cobalt and impurities, the dimensions of each of said particles being that of a single magnetic domain.

3. The magnetic material of claim 2 in which each of said particles has a coating comprising the reaction product of antimony and said fine particles.

4. A magnetic structure comprising non-elongated fine particles, each of said particles consisting essentially of an alloy of from 10 to 15 percent nickel, the balance substantially all cobalt and impurities, the dimensions of each of said particles being that of a single magnetic domain, and a matrix for said fine particles comprising lead.

References Cited in the file of this patent

UNITED STATES PATENTS

| | | |
|---|---|---|
| 1,853,924 | Owens | Apr. 12, 1932 |
| 1,954,102 | Roseby | Apr. 10, 1934 |
| 2,242,234 | Carpenter | May 20, 1941 |
| 2,744,040 | Altmann | May 1, 1956 |
| 2,812,276 | West et al. | Nov. 5, 1957 |

| | | |
|---|---|---|
| 2,974,104 | Paine et al. | Mar. 7, 1961 |
| 2,999,777 | Yarmartino et al. | Sept. 12, 1961 |
| 2,999,778 | Mendelsohn | Sept. 12, 1961 |

OTHER REFERENCES

Ferromagnetism by Richard M. Bozorth, pub. by D. Van Nostrand Co. Inc., 1959, pages 276–280 relied on.

Magnetic Properties of Metals and Alloys by R. M. Bozorth et al., pub. by the A.S.M., 1959, pages 149–153 relied on.